(12) United States Patent
Werthwein

(10) Patent No.: US 8,939,692 B2
(45) Date of Patent: Jan. 27, 2015

(54) THREAD-FORMING SCREW AND USE THEREOF

(75) Inventor: Bernd Werthwein, Sindringen (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 0 days.

(21) Appl. No.: 13/520,024

(22) PCT Filed: Dec. 27, 2010

(86) PCT No.: PCT/EP2010/070748
§ 371 (c)(1),
(2), (4) Date: Oct. 29, 2012

(87) PCT Pub. No.: WO2011/083060
PCT Pub. Date: Jul. 14, 2011

(65) Prior Publication Data
US 2013/0047414 A1 Feb. 28, 2013

(30) Foreign Application Priority Data
Jan. 6, 2010 (DE) .......................... 10 2010 000 702

(51) Int. Cl.
*F16B 25/00* (2006.01)
*F16B 25/10* (2006.01)

(52) U.S. Cl.
CPC ........... *F16B 25/106* (2013.01); *F16B 25/0021* (2013.01); *F16B 25/0078* (2013.01); *F16B 25/0084* (2013.01)
USPC .......................................... 411/386; 411/424

(58) Field of Classification Search
USPC ........... 411/386, 387.1, 387.4, 394, 411, 416, 411/424, 426, DIG. 1
See application file for complete search history.

(56) References Cited

U.S. PATENT DOCUMENTS

| | | | | |
|---|---|---|---|---|
| 3,156,152 A | * | 11/1964 | Reed | 411/386 |
| 3,177,755 A | * | 4/1965 | Kahn | 411/386 |
| 3,195,156 A | * | 7/1965 | Phipard, Jr. | 470/10 |
| 3,246,556 A | * | 4/1966 | Phipard, Jr. | 411/416 |
| 3,446,262 A | * | 5/1969 | Phipard, Jr. | 411/257 |
| 3,461,470 A | * | 8/1969 | Cochrum | 470/10 |
| 3,918,345 A | * | 11/1975 | Phipard, Jr. | 411/416 |
| 5,044,855 A | * | 9/1991 | Fukubayashi | 411/386 |
| 5,209,622 A | * | 5/1993 | Kazino et al. | 411/386 |
| 5,234,301 A | * | 8/1993 | Grossberndt et al. | 411/386 |
| 5,244,327 A | * | 9/1993 | Whitesell | 411/386 |
| 5,540,531 A | * | 7/1996 | Choiniere | 411/387.1 |

(Continued)

FOREIGN PATENT DOCUMENTS

| | | |
|---|---|---|
| DE | 3909725 C1 | 9/1990 |
| DE | 19634417 C2 | 3/1998 |

(Continued)

*Primary Examiner* — Roberta Delisle
(74) *Attorney, Agent, or Firm* — Boyle Fredrickson, S.C.

(57) ABSTRACT

A screw having a polygonal cross section exhibits a threaded section and a forming section adjoining the threaded section and extending as far as a front rounded end of the screw and, if necessary, being free of threads. The lateral line of the forming section, if necessary free of threads, runs smoothly and without interruption from the threaded section as far as the tip at a constant curvature. The screw serves for the attachment of an element to a sheet metal component, whereby said screw engages in an existing hole in the sheet metal component and forms the thread itself. Said screw is thereby also capable of enlarging the hole and forming a raised rim hole.

11 Claims, 3 Drawing Sheets

(56) References Cited

U.S. PATENT DOCUMENTS

| | | | |
|---|---|---|---|
| 5,779,417 A * | 7/1998 | Barth et al. | 411/412 |
| 6,494,656 B1 * | 12/2002 | Boyer et al. | 411/399 |
| 7,377,734 B2 * | 5/2008 | Bechtel et al. | 411/386 |
| 2006/0056940 A1 * | 3/2006 | Griffin et al. | 411/416 |
| 2006/0291979 A1 * | 12/2006 | Bechtel et al. | 411/386 |
| 2009/0311074 A1 * | 12/2009 | Friederich et al. | 411/387.4 |

FOREIGN PATENT DOCUMENTS

| | | |
|---|---|---|
| DE | 19637969 A1 | 3/1998 |
| DE | 19653394 A1 | 6/1998 |
| DE | 102006058464 A1 | 12/2007 |
| DE | 102006034583 A1 | 1/2008 |
| DE | 102006034585 A1 | 1/2008 |
| DE | 29801813 U1 | 4/2008 |
| DE | 202008015352 U1 | 3/2009 |
| DE | 202009009651 U1 | 10/2009 |
| DE | 102008033509 A1 | 1/2010 |
| EP | 0338973 A2 | 3/1989 |
| EP | 1262669 A1 | 5/2001 |
| JP | 3066901 | 3/1991 |
| WO | 2010003901 A1 | 1/2010 |

* cited by examiner

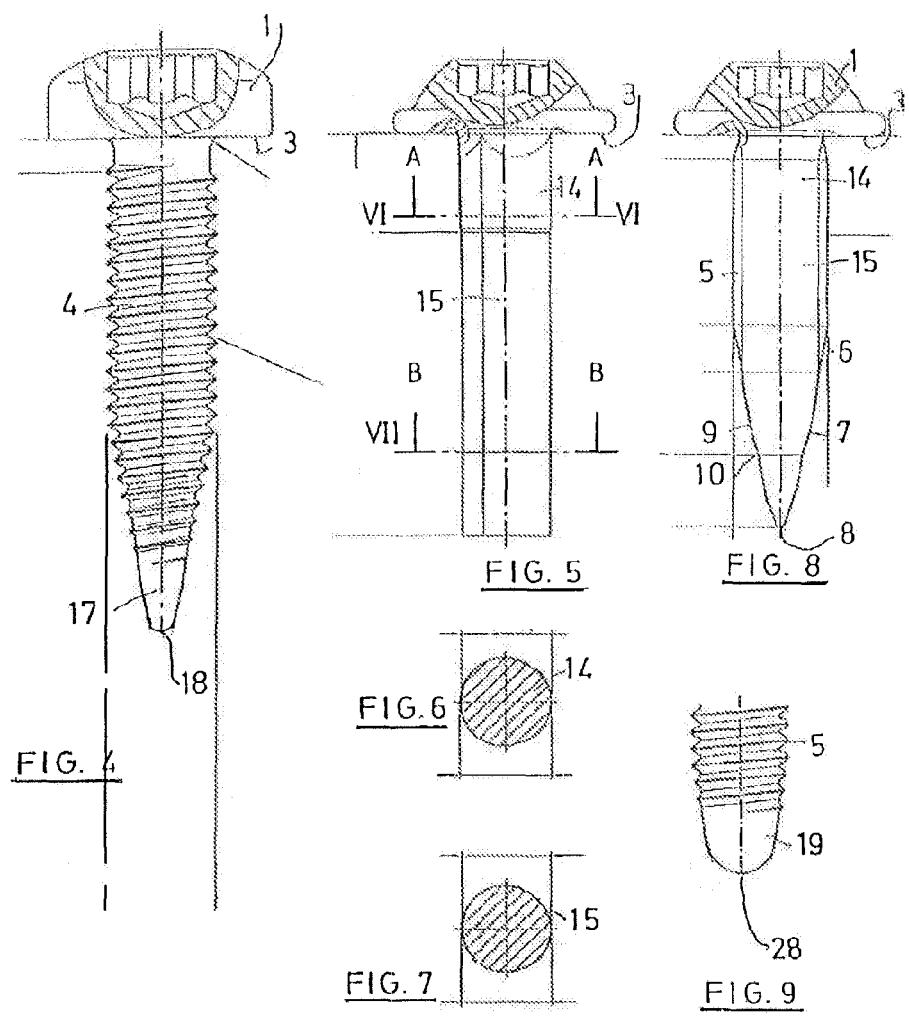

THREAD-FORMING SCREW AND USE THEREOF

The invention relates to a thread-forming screw.

Sheet metal components, which are intended to be detachably connected to one another, are screwed together as a rule by means of self-tapping screws or modified threaded elements. As a rule, the screwed connection requires piercing of the component and the part to be clamped. Piercing of the component can be effected by drilling, punching, deep drawing or a similar operation. The threads are either already preformed or precut, or they may be formed by the screw itself as it is screwed in.

Previously disclosed is a hole-forming and thread-forming screw, which comprises a screw shank having a threaded section and an adjoining thread-free part. The thread-free part of the screw shank exhibits cylindrical form initially in the part adjoining the thread and thus does not reduce in diameter. This cylindrical part should exhibit a length equivalent to four times the thickness of the sheet. The tip of the screw is of crowned configuration (DE 3909725).

Also previously disclosed is a thread-producing screw having a cylindrical threaded section and a conical tip, which terminates in an actual tip. A thread is present in the vicinity of the screw tip (DE 10 2006 058 464).

The object of the invention is to further develop a thread-forming screw having regard to its improved characteristics.

To achieve this object, the invention proposes a screw having the characterizing features referred to in claim 1 and a use for this screw. Further developments of the invention are the subject of the dependent claims.

In contrast to the state of the art, the thread-free section already decreases in diameter directly at the end of the thread. The purpose of this at least partially thread-free area, which decreases in its diameter, is to form inside the hole a raised rim, the purpose of which is to permit better retention of the thread in the material. This section is referred to for this reason as a forming section.

As a further development of the invention, provision can be made for the edge of the thread of the screw shank, in a projection perpendicular to a plane of the longitudinal axis of the screw deviating from a circular form, to form a polygon, especially a triangle, having rounded edges and convex sides, that is to say a form which is also known as polylobular.

It is proposed in particular that the core cross-section of the threaded section of the screw exhibits such a form.

As a further development of the invention, provision can be made for the threaded section of the shank of the screw to exhibit a first tapping section adjoining the forming section and a second adjoining retaining section extending as far as the head of the screw. Provision can also be made, at the same time, for the cross section through the shank of the screw in the retaining section to be of less strongly polygonal configuration than in the tapping section. In particular, the retaining section can exhibit a circular cross section. This takes into account the fact that the primary reason for the presence of the tapping section is to form a thread in the formed raised rim, but without the resistance to screwing-in being too high. However, the actual securing of the object to be screwed in position should take place in the retaining section, which is present directly beneath the head of the screw.

As yet a further development of the invention, provision can be made for the cross section of the thread-free section of the shank of the screw to exhibit the form of a polygon, especially a triangle, having rounded edges and convex sides.

In a preferred embodiment, the screw thus exhibits such a polylobular cross section over its entire length, where appropriate with the exception of the retaining section.

The external diameter of the threaded section can be executed immediately ahead of the forming section.

The lateral line of the forming section can run at least partially in a straight line so that the forming section is of conical configuration.

It is also possible, however, for the lateral line of the forming section to run in a curved line, wherein the curvature concerned may be a constant curvature or may also comprise two sections having different but constant curvature.

The forming section can be free of threads in its entirety or partially free of threads. For example, provision can be made for the forming section to remain smooth initially, starting from the tip, but for a thread to be present in the forming section already before reaching the tapping section, the height of which thread gradually increases.

It has proved to be particularly useful for the thread to be in the form of a round thread.

The retaining section, which begins immediately beneath the head of the screw, and which can preferably exhibit a circular cross section, can additionally be of slightly conical configuration, whereby the diameter increases in the direction of the head of the screw. The conical form can lie within the range from about 1° to about 10°.

The screw proposed by the invention can find an application not only in metal sheets, but also in fiber composite materials and plastics and in the attachment of objects made of material combinations.

The invention also proposes the use of a screw having the characterizing features described herein for the connection of pierced components. The screw can be used in particular with pierced components in which the size of the hole is smaller than the core diameter of the screw. The polygonal cross section of the forming section results in the ability to produce a raised rim here. The raised rim serves the purpose of improving the retention force of the screw.

For this reason, the screw is particularly suitable for use in very thin sheets. The material of the sheets, not only in very thin sheets, can be sheet steel, light alloy and NF metals.

The holes can be punched, drilled, cast or produced with the help of a laser. Holes cut with a water jet or deep drawn holes are also suitable for the use of the screw.

The use of the screw results in the possibility of easy setting of the screw with a low axial contact pressure, in the occurrence of constantly low screwing torques and tapping torques and in the improvement of the extraction force.

This applies in particular when the retaining section is of conical configuration, whereby the core diameter of the shank of the screw increases towards the head. Conical forms in the range from 1° to about 10° are appropriate here.

Further characterizing features, details and benefits of the invention can be appreciated from the claims and the abstract, of which the wording in both cases makes reference to the content of the description, from the following description of preferred embodiments of the invention and on the basis of the drawing. In the drawing:

FIG. 4 depicts a side view of a screw according to a second embodiment;

FIG. 5 depicts the side view of a wire nail provided with a head;

FIG. 6 depicts a cross section through the wire nail along the line VI-VI;

FIG. 7 depicts a cross section through the wire nail along the line VII-VII;

FIG. 8 depicts a side view of a screw according to a further embodiment;

FIG. 9 depicts the front area of a screw according to yet a further embodiment;

FIG. 10 depicts a screw which has been screwed in;

Figure 1:
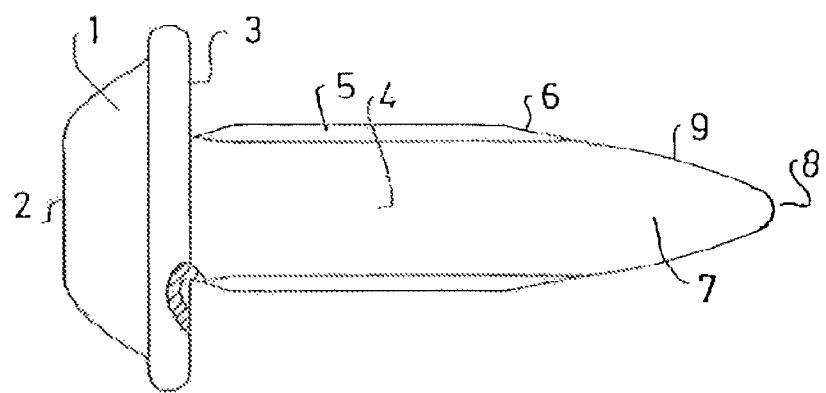
FIG. 1 depicts a side view of the screw proposed by the invention.

The screw depicted in FIG. 1 consists of a screw head 1 exhibiting a recess on its end face 2, the recess being used to drive the screw. It would also be possible for a projection to be provided as a screw driving means.

Extending centrally from the underside 3 of the head 1 of the screw lying in a single plane is a screw shank 4, which shank, starting from the head 1 of the screw, is initially of cylindrical configuration and exhibits a thread 5. The thread then terminates in a relatively short section 6. This section is the so-called tapping zone. This section provided with the thread 5 is then adjoined by the thread-free forming section 7, which terminates in a rounded tip 8. The external contour 9 of the thread-free section 7 to be seen in FIG. 1 is continuously curved, in actual fact with a constant curvature. The thread-free forming section 7 in its entirety provides the rounded front end 8 of the screw.

Figure 2:
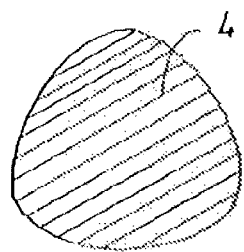
FIG. 2 depicts a cross section through the screw.

FIG. 2 depicts a cross section through the shank of the screw. For reasons of simplification, the course of the external diameter of the thread has been laid out in a single plane in this case. It can thus be appreciated that the cross section through the screw shank is formed by a triangle having rounded corners and convex curved sides. Such a form is also known as a trilobular form.

This cross-sectional form is present in the screw both on the core of the thread section and on the external diameter of the thread 5, as well as in the thread-free forming section 7.

Figure 3:
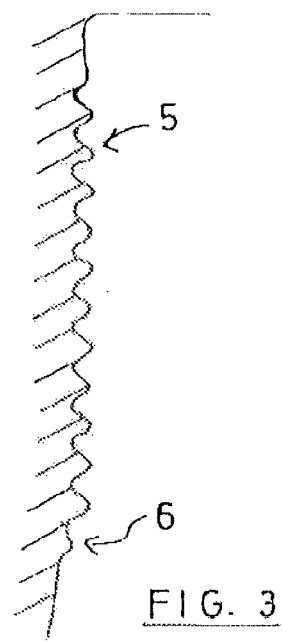
FIG. 3 depicts an axial section on an enlarged scale.

FIG. 3 depicts on an enlarged scale a partial section through the threaded section of the shaft 4 of the screw. It can be seen here that the thread 5 is a round thread, in which the turns of the thread run in a rounded fashion both on the projections and on the recesses.

Whereas FIG. 1 depicts a screw in which the front forming section 7 is completely free of threads, FIG. 4 depicts a side view of a screw in which the front forming section 17 initially remains free of threads, starting from a rounded tip 18, but adjoined to which is a section in which a thread gradually develops until it merges into the shaft section 4 with the completely formed thread.

Considered in more detail below is FIG. 5, which depicts a blank from which the illustrated screws are manufactured. Whereas the different cross-sectional forms are not necessarily capable of being appreciated in the side views, this is easier to achieve in the illustration of the starting product. A wire, on which a screw head 1 is initially formed, is used as the starting product for the manufacture of a screw. This screw head 1 is depicted partially in section in FIG. 5, so that the driving arrangement in the form of a recess that is present in the head 1 can also be seen. Immediately beneath the underside of the screw head 1, the wire exhibits a cross section of which the diameter is rather larger. The length of this section 14 more or less corresponds to the diameter. The remaining part of the wire, of which the diameter is rather smaller than in the upper area, then adjoins this first section 14. It can be appreciated from FIGS. 6 and 7 that, at this stage of the manufacture of the screw, the cross-sectional form of the two sections, which are separated by a step, can also be distinguished. In the area 14 immediately adjoining the screw head, the cross section is completely circular, for example, whereas it exhibits an aforementioned polygonal form in the other section. These two different cross-sectional forms and also cross-sectional quantities are retained after rolling the thread. As a result, the screw depicted once again in FIG. 8 exhibits a retaining section 14 adjoining the head of the screw, which in turn is adjoined by the tapping section 15, in which the cross section exhibits the polygonal form. This polygonal form also continues through the forming section 7 as far as the front end 8 of the screw. In the embodiment depicted in FIG. 8, the forming section 7 exhibits two sections in which the lateral line 9 runs in a curved manner, in fact with a different curvature in both sections, so that a kind of indentation 10 is formed in this way.

In the embodiment of the screw proposed by the invention depicted only in its front area in FIG. 9, the front end 28 of the screw is almost hemispherically rounded with a relatively large radius of curvature. No shaft thread 5 is present until the point of transition to the cylindrical section 4 of thread.

As soon as the screw is inserted into the available hole, the thread-free part serves the purpose of transforming the hole into a raised rim. The thread is then formed in this raised rim by the tapping section. A screw of this kind is particularly suitable for the connection of sheet metal parts, on the inside of which a contact with cables or other objects may be present.

Figure 12:
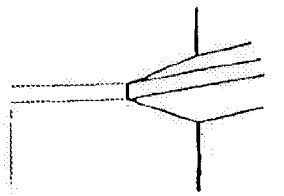
FIG. 12 depicts a detail of the thread of the screw in FIG. 11.
Figure 11:
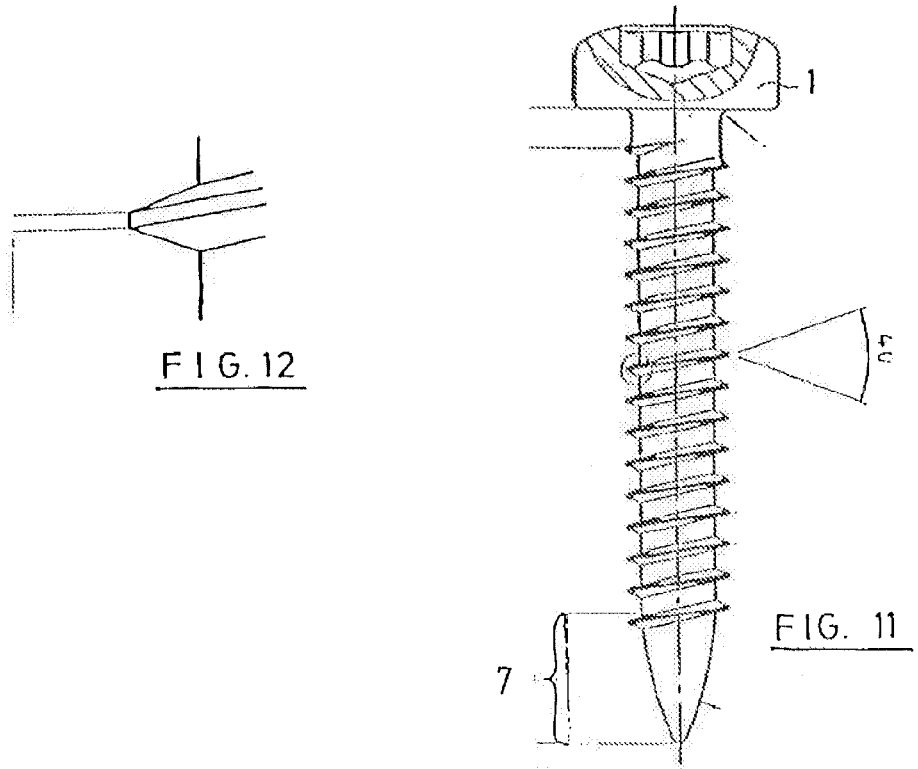
FIG. 11 depicts a side view of a screw according to a further embodiment.

FIG. 11 depicts a side view of a further embodiment of the screw, whereby the screw exhibits a so-called plastic thread. A distance is present between the individual turns of the thread. The tip angle of the thread, indicated on the right in FIG. 11, is about 40°. The thread is symmetrical. It does not form a sharp thread edge, but rather a flattened area, which can be seen on the left in FIG. 12.

Use of the described screw:

The nature of the connection of the screw proposed here can best be explained with reference to FIG. 10. The screw depicted in FIG. 8 is used as an example in this case. The screw with the front forming section 7, of which the cross section is of triangular form having rounded corners and sides, is inserted with this forming section into the holes in the components that are to be connected and is driven in at high speed with the help of a screwdriver or the like. The approximately triangular cross section with its rounded corners ensures, after inserting the front end of the screw, that the screw continues to rotate at very high speed at this time and is pressed home, and with only intermittent frictional contact at its periphery. The need for welding between the screw and the component is avoided in this way.

Once the forming section has penetrated almost completely into the component and has produced a raised rim, the speed of rotation is reduced to the customary rate of screwing because of the increasing resistance. The contact pressure is reduced at the same time. The first turn of the thread 5 now engages in the component, so that forced feeding takes place. The process of forming the thread now commences.

The cross section of the screw shank inside the threaded section similarly exhibits the aforementioned triangular profile with rounded corners. This profile similarly offers the advantage that lower friction, and thus a lower screwing torque, arise as a result of the fact that frictional contact does not occur around the entire periphery, but only intermittently. At the same time, the material of the component in the tapped hole that has been formed in this way exhibits the tendency to spring back inwards. A kind of deliberate self-inhibition is produced in this way, which results in the screwed connection being secured against unintentional release.

Figure 10:
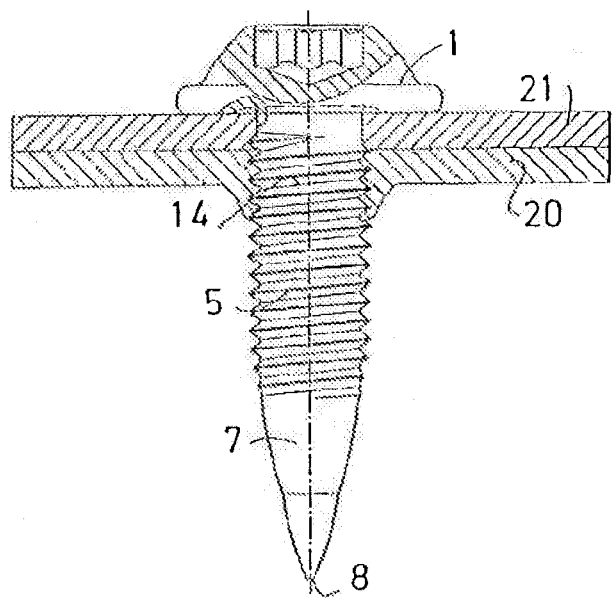

The result can be found in FIG. 10. It must be appreciated that, in the second metal sheet 20, to which the first metal sheet 21 is to be secured, a raised rim hole has been produced, which forms a wall that is longer in the axial direction, in which wall the thread of the screw engages. This part of the screw shank corresponds to the retaining section 14 explained with reference to FIG. 5.

A comparison of the embodiments depicted in FIG. 4 and FIG. 9, for example, with one another reveals that the nature of the rounding in the front area of the screw varies to a greater or lesser degree. It can also be appreciated that a screw having the embodiment depicted in FIG. 4, for example, can find an application in a size of hole which is clearly smaller in relation to the core diameter of the screw shank. On the other hand, a screw having the embodiment according to FIG. 9 is suitable for a hole which is almost as large as the core diameter of the screw shank.

In the case of the thread on the shaft, this can be not only a round thread, as depicted, but also a metric thread or, depending on the particular application, a metal sheet thread or a self-tapping thread. The thread can also be configured as an asymmetrical thread, and also as a coarse thread.

In order to increase the rate of feed, the thread can also be configured as a double thread.

The invention claimed is:

1. A hole-forming and thread-forming screw, having a screw head (1), which exhibits a screw driving arrangement, a screw shank (4), which exhibits a cylindrical section of thread having a retaining section (14) starting from the head of the screw and an adjoining tapping section (15), and a partially thread-free forming section (7) extending as far as a front end (8) of the screw, of which the cross section reduces continuously in the direction of the front end (8) of the screw, such that the front end (8) of the screw is rounded and configured to enlarge a pilot hole to form a raised rim hole, whereby the core cross section of the threaded section of the shank (4) of the screw exhibits, at least within the tapping section (15), the form of a polygon, especially a triangle, having rounded corners and convex sides.

2. The screw as claimed in claim 1, wherein the cross section of the shank of the screw in the retaining section (14) is configured with a less distinctly polygonal form than in the tapping section (15), and if necessary also with a circular form.

3. The screw as claimed in claim 1, wherein the cross section of the forming section (7) exhibits the form of a polygon, especially a triangle, having rounded corners and convex sides.

4. The screw as claimed in claim 1, wherein the external diameter of the thread (5) decreases in the transition from the threaded section to the forming section (7).

5. The screw as claimed in claim 1, wherein the lateral line (9) of the tapping section (17) at least partially runs in a straight line and/or in a curved line.

6. The screw as claimed in claim 1, wherein the tapping section (7) is free of threads, starting from the front end (18) of the screw, and exhibits a thread with an increasing thread height ahead of the threaded section.

7. The screw as claimed in claim 1, wherein the shank of the screw in the retaining section (14) is of slightly conical configuration.

8. The use of a screw as claimed in claim 1, for the thin sheet screwing of pierced components.

9. The use as claimed in claim 8, wherein the diameter of the hole in the components to be screwed together is smaller than the core diameter of the shank of the screw.

10. The use of a screw as claimed in claim 1, for plastics and/or fiber composite materials.

11. The use as claimed in claim 10, wherein the diameter of the hole in the components to be screwed together is smaller than the core diameter of the shank of the screw.

* * * * *